Patented Nov. 25, 1947

2,431,461

UNITED STATES PATENT OFFICE 2,431,461

OLEFINIC POLYMERIZATION PRETREATMENT

John D. Calfee, Westfield, and Robert M. Thomas, Union, N. J., assignors to Standard Oil Development Company, a corporation of Delaware No Drawing. Application December 16, 1943, Serial No. 514,544

13 Claims. (Cl. 260—93)

This invention relates to olefinic polymerization processes, relates particularly to processes for the interpolymerization of isoolefins and polyolefins to yield sulfur reactive materials, and relates especially to means for overcoming polymerization time lag and overcoming the effects of impurities in the polymerization mixture.

It has been found possible to produce an extremely valuable polymer by the interpolymerization of an isoolefin such as isobutylene with a polyolefin such as butadiene, or isoprene, or piperylene, or dimethyl butadiene, or dimethallyl, or myrcene, or the like, by cooling the mixture to temperatures ranging from $-10°$ C. to $-103°$ C. or even as low as $-160°$ C. and the application at the low temperature of a Friedel-Crafts catalyst in solution in a low-freezing, non-complex-forming solvent to yield an interpolymer having a molecular weight ranging between 20,000 to 100,000 or even as high as 500,000 with an iodine number ranging from 0.5 to 40 or 50; which is reactive with sulfur and various other curing agents to eliminate the cold flow properties in the original material and yield a tensile strength ranging from 500 to 5000 pounds per square inch and an elongation at break ranging from 100 to 1200%.

This polymerization process can be conducted in successive batches; or it can be conducted in continuous process in which a steady stream of olefinic feed material, refrigerant and catalyst is supplied to a reactor and a steady stream of overflow containing polymer, preferably in slurry form, results. In the batch process a considerable reduction in quality of the polymer results from very small traces of a wide variety of impurities; and in the continuous process, not only does the presence of traces of impurity result in reduction of the quality of the polymer produced; and in many instances the quantity as well, but the induction period observed in the batch process makes control of the continuous process difficult, since, if the reaction occurs promptly, the rate at which the fresh feed is polymerized can be controlled by adjustment of the rate of catalyst feed, whereas if there is a substantial induction period, especially if the induction period varies with the amount of impurities present and the amount of catalyst present, control of the reaction is practically lost, since the reaction may proceed slowly until the induction period expires, then proceed rapidly in the presence of insufficient quantities of refrigerant, resulting in very unsatisfactory polymerization procedure to yield low-grade polymer and to yield a product which does not slurry readily and may even plug the reactor, preventing circulation and preventing overflow of feed necessitating a shutdown for cleaning; and restarting with fresh materials.

The present invention provides means for removing the impurities and simultaneously overcoming the induction period. According to the invention, the olefinic material for the polymerization reaction is given a preliminary treatment with a small quantity of a metal halide or a modified Friedel-Crafts active metal halide. The preferred substance is a Friedel-Crafts hydroxy halide such as aluminum hydroxy chloride, $AlCl_2OH$, or the like, and it is found that this preliminary treatment eliminates the effect of traces of impurities and simultaneously greatly reduces or eliminates entirely the induction period. This treatment also greatly improves the physical character of the slurry maintained in the reactor, consistently giving a slurry containing discrete particles of solid polymer which are grainy in character, rather than the slimy, gelatinous character of the solid in the continuous reactor when traces of poisons and impurities are present. Also the procedure greatly decreases the highly objectionable tendency of the polymer to collect in a slimy, sticky, gelatinous form on the reactor walls.

Thus the process of the invention produces a copolymer of an isoolefin with a polyolefin in either batch or continuous process by the use of a pretreatment of the olefinic material with a non-polymerizing metal halide which eliminates the effect of impurities and eliminates or greatly reduces the induction period otherwise characteristic of the polymerization catalyst, to yield a solid polymer which is in better physical form for slurry and of better physical properties. Other objects and details of the invention will be apparent from the following description:

In practicing the invention, an olefinic mixture is prepared consisting of a major proportion of an isoolefin such as isobutylene which is the preferred isoolefin, although other isoolefins such as 2-methyl butene-1, or 2-methyl pentene-1, or 2-methyl hexene-1 may be used; with a minor proportion of a polyolefin such as butadiene, isoprene piperylene, dimethyl butadiene, dimethallyl, myrcene, or the like, substantially any one or more of the polyolefins having from 4 to 12 or 14 carbon atoms per molecule being usable. The mixture may be used as prepared, or it may be diluted with a diluent such as one or more of the mono or poly alkyl halides having up to about 5 carbon atoms per molecule, or carbon disulfide or its homologues and analogues, or the lower paraffins up to 6, 8 or 10 carbon atoms per molecule, or the like. The mixture is cooled to a temperature below $-10°$ C., ranging to a temperature as low as $-160°$ C., the preferred temperature range lying between $-40°$ C. and $-103°$ C. The cooling may be accomplished by a refrigerating jacket surrounding the reaction vessel, substantially any of the ordinary refrigerants being usable for this purpose, including such materials as liquid carbon dioxide, liquid sulfur dioxide, liquid ethane, liquid ethylene and even liquid methane, under pressure or suction as needed to give the desired temperature. Alternatively, the cooling may be accomplished by the direct addition of a suitable refrigerant to the reaction mixture. For this purpose liquid propane may be used, or liquid or solid carbon dioxide, or liquid ethane, or liquid ethylene, or even liquid methane; the preferred internal refrigerants being solid carbon dioxide or liquid ethylene.

The cold reaction mixture is then polymerized by the application thereto of a Friedel-Crafts catalyst in solution in a low-freezing, non-complex-forming solvent. A suitable Friedel-Crafts catalyst is aluminum chloride in solution in ethyl or methyl chloride or carbon disulfide. However, substantially any of the soluble, active metal halide Friedel-Crafts catalysts, as disclosed by N. O. Calloway in his article on "The Friedel-Crafts Synthesis" printed in the issue of "Chemical Reviews," published for the American Chemical Society at Baltimore, in 1935, in volume XVII, No. 3, the article beginning on page 327, the list being particularly well shown on page 375, may be used. These Friedel-Crafts catalysts may be used as the active metal halides, or they may be modified and their properties improved by such procedures as the conversion to the alkoxide or by the formation of double halides of one metal with two halides, or two metals with two halides to form double salts and analogous modifications. For the catalyst solvent, substantially any of the mono- or poly-alkyl halides having carbon numbers below about 5, and freezing points below 0° C. are useful, although in some instances, provisions must be taken to prevent decomposition of the halide. Alternatively, carbon disulfide and its analogues and homologues are extremely useful; these solvents consisting of carbon compounds containing acid-forming substituents selected from groups 6 and 7 of the periodic table. In addition, various of the lower paraffins are suitable for solvents, especially with the double halides which show an excellent solubility in the lower paraffins.

The catalyst solution is added to the polymer mixture by any convenient means which will insure a rapid and effective dispersion of the catalyst solution into the body of the olefinic material. A convenient procedure is to spray the catalyst solution on the surface of the rapidly stirred cold olefinic material. Alternatively, the catalyst solution may be delivered as a stream into a high turbulence zone in the olefinic material, or other means which will be obvious to those skilled in the art may be used. The polymerization proceeds rapidly to the formation of a solid polymer which is removed from the reactor in any convenient way, brought up to room temperature and purified and compounded in any convenient manner.

In practicing the present invention, the reaction mixture is treated before or after cooling (preferably after) but before the addition of the main catalyst, by the application thereto of a metal halide substance, such as a hydroxylated Friedel-Crafts substance which may be a non-catalyst, or may be a slow catalyst. Such substances as hydroxy aluminum chloride, $AlCl_2OH$, are particularly useful but other analogous substances such as stannic chloride, silicon tetra chloride, titanium hydroxy chloride, zirconium hydroxy chloride, and the like are particularly useful. The treatment with these compounds is preferably conducted just before the addition of the main catalyst; either in the polymerization reactor, or immediately prior to the delivery of the material to the polymerization reactor. Alternatively, this treatment may be applied at a considerable range of times; even as much as many hours or days in advance of the actual polymerization reaction, provided care is taken to avoid subsequent contamination of the reactive material by impurities. This treatment is found to be highly effective for the removal of such impurities as traces of water and oxygenated organic compounds, such as the various alcohols including both methyl, ethyl and propyl alcohol and any others which may be derived from impurities in the reactants or from side reactions catalyzed by the aluminum chloride, and the like as well as any traces of aldehydes, ketones, acids, ethers and similar impurities. It is also possible that the metal halide materials begin the polymerization process, or initiate some preliminary reaction so as to permit the main catalyst to continue the reaction immediately and at high speed, in the substantial absence of interfering impurities depending upon the character of the active metal; its chemical compounds and the nature of the impurities.

The essence of the invention is the preliminary treatment of the olefinic feed material with a metal halide or modified Friedel-Crafts halide which, so far as the olefinic material is concerned, appears to be inactive as a polymerization catalyst, or of such low activity that perceptible quantities of polymer are not formed before the addition of the active catalyst; followed by a subsequent treatment with a high power Friedel-Crafts catalyst in solution to permit the production of the desired high molecular weight interpolymer without interference from impurities and without interference from a delayed catalyst action. The metal halide used for the preliminary treatment may be a material which is wholly inactive for polymerization purposes, or may be a slow-acting Friedel-Crafts catalyst which is of such lower power that no detectable or substantial polymerization reaction occurs before the addition of the active catalyst. It does not as yet appear that the catalyst must be so weak as to produce absolutely no polymerization of itself but it is desirable that the polymerization be either absent or negligible in amount. Thus, stannic chloride is highly efficient for the preliminary treatment and it produces no detectable polymerization over a period of many hours or days; aluminum hydroxy chloride is a very low power catalyst, and it produces no perceptible polymerization over a period of a few minutes to a few hours, although on many hours of standing, small amounts of low-grade polymer may be produced under certain circumstances.

EXAMPLE 1

A reaction mixture was prepared consisting of 98.55 parts by weight of isobutylene of 98% purity and 1.45 parts by weight of isoprene of 93% purity diluted with 3 volumes of methyl chloride per volume of mixed olefins. A catalyst solution consisting of aluminum chloride dissolved in methyl chloride to a concentration of 0.2% was added to the polymer mixture for successive discrete intervals, and the solid polymer formed during each interval was removed and measured. The results are shown in the following Table I:

Table I

| Time interval of catalyst addition in seconds [1] | 0-15 | 15-30 | 30-45 | 45-60 | 60-75 | 75-90 | 90-105 |
|---|---|---|---|---|---|---|---|
| Grams polymer formed in each 15 sec. interval | 2 | 10 | 41 | 62 | 31 | 41 | 0 |

[1] Catalyst of 0.2% strength added at rate of 1 cc. per second.

It will be noted from this table that comparatively little polymer was formed during the first 15 seconds, and a relatively small amount during the second 15-second interval.

Another polymerization was then conducted upon a similar mixture to which 50 parts of a solution of aluminum hydroxy chloride, $AlCl_2OH$, in methyl chloride in 0.2% concentration was added to the reaction mixture before the polymerization catalyst was added. The results obtained are shown in Table II:

Table II

|  | Control Run [1] | Feed Plus 50 cc. of 0.2% $AlCl_2OH$ Solution [1] | Feed Plus 50 cc. of 0.2% $AlCl_2OH$ Solution [2] | Feed Plus 100 cc. of 0.2% $AlCl_2OH$ Solution [2] |
|---|---|---|---|---|
| Time of Catalyst Addition in Seconds | 30 | 30 | 120 | 120 |
| No. Grams Polymer Formed | 10 | 75 | 75 | 125 |

[1] Catalyst of 0.2% strength added at rate of 1 cc./sec.
[2] Catalyst of 0.2% strength added at rate of 0.5 cc./sec.

It will be noted from the first column in the table that in the absence of the aluminum hydroxy chloride, very little polymer is formed in the first 30 seconds, whereas the addition of the aluminum hydroxy chloride very greatly increases the amount of polymer formed. It should be noted that the presence of aluminum hydroxy chloride alone does not produce any weighable amount of polymer during a time interval of 6 to 24 hours.

It may be noted that the physical properties of the polymer so produced are as good as the polymer produced without the auxiliary treatment, as far as tensile strength, elongation, flexure and abrasion resistance, and the like, are concerned, and may, when relatively impure olefinic materials are used, be considerably better. An important advantage of the procedure, however, is the very greatly improved physical character of the slurry obtained, and the absence of precipitation of slimy polymer on the walls of the reactor.

EXAMPLE 2

The effect of this treatment upon the reaction in the presence of such impurities as methyl alcohol is very conspicuous. A reaction mixture was prepared as in Example 1 and polymerized with the normal catalyst to obtain a normal slurry of solid polymer. To a second portion of the olefinic material there was then added 0.03 part of methyl alcohol per 100 parts of olefinic material. Polymerization of this mixture by the normal catalyst yielded a small quantity of very poor polymer slurry. To a third portion of the polymerization mixture there was then added 0.03 part of methyl alcohol per 100 of olefinic material, and 0.2 part of aluminum hydroxy chloride dissolved in methyl chloride per 100 of olefinic material. Polymerization of this material yielded a conversion approximately equal to that found in the normal polymerization and a normal, highly satisfactory slurry.

The results are well summarized in Table III:

Table III

| SO No. | Impurity Added | Feed | $AlCl_2OH$ Added | Catalyst Added | Conversion Per cent | Catalyst Efficiency | Remarks |
|---|---|---|---|---|---|---|---|
| 1 |  | 400 cc. B-3-96 hydrocarbon 1200 cc. MeCl. |  | 1'40" of 0.2 cat. at 43 cc./min. | 61 | 1,100 | Normal slurry. |
| 2 | 0.1 cc. MeOH | do |  | 4' of 0.2 cat. at 43 cc./min. | 24 | 180 | "Slimy" slurry. |
| 3 | do | do | 0.2 g. dissolved in MeCl. | 2' of 0.2 cat. at 43 cc./min. | 70 | 1,060 | Normal slurry. |

The results show the effect of the presence of methyl alcohol upon the polymerization reaction, and the neutralization of this effect by the preliminary treatment of the present invention.

These polymers, prepared in the presence of aluminum hydroxy chloride, were brought up to room temperature, washed on the mill and compounded according to the following recipe:

|  | Parts |
|---|---|
| Interpolymer | 100 |
| Zinc oxide | 5 |
| Stearic acid | 3 |
| Carbon black | 10 |
| Sulfur | 3 |
| Tetramethyl thiuram disulfide | 1 |

Samples of polymers so compounded were cured for time intervals of 15, 30 and 60 minutes at a temperature of approximately 135° C. and were then given the usual evaluation tests. The tensile strengths were found to be approximately the same as that of high-grade polymer to wit: 2800 pounds per square inch at break with an elongation at break of approximately 1100%; in addition, the samples showed a flexure resistance superior to that of the best natural rubber and an abrasion resistance superior to that of the best natural rubber. The polymer showed a molecular weight (determined by the Staudinger method) of approximately 65,000 and a molecular unsaturation of approximately 1.5%.

EXAMPLE 3

Similar tests were conducted with the addition of $\frac{1}{10}$ cc. of water, and similar results to those shown in Table III were noted.

EXAMPLE 4

Similar tests were conducted with ethylene glycol, 0.1 cc. of the glycol being added, as in Example 2, and closely similar results were obtained.

EXAMPLE 5

Similar results were obtained with propyl alcohol in the proportion of 0.1 cc. per 400 ccs. of feed, as in Example 2, yielding analogous results.

These examples thus show the very great improvement in operating characteristics obtained in the polymerization process by the above described preliminary treatment with an inactive metal halide compound.

Thus the process of the invention simultaneously neutralizes the more common impurities in the reaction mixture and overcomes the induction lag at the beginning of the polymerization reaction to simplify and improve the polymerization process, especially under conditions of continuous operation, to improve the yield of polymer, and the physical properties of the polymer.

The invention claimed is:

1. In a process for the polymerization of isobutylene and a polyolefin having 4 to 10, inclusive, carbon atoms per molecule at temperatures within the range between −10° C. and −160° C. by the application of the steps in combination of adding to isobutylene and polyolefin a metal halide compound selected from the group consisting of aluminum hydroxy chloride, stannic chloride, silicon tetrachloride, titanium hydroxy chloride and zirconium hydroxy chloride in an amount within the range between 0.1% and 0.2% so that no polymerization is produced but purification is effected, and thereafter polymerizing the mixture at a temperature between −10° C. and −160° C. by the application to the cold mixture of a Friedel-Crafts catalyst.

2. In a polymerization process the steps in combination of cooling a major proportion of isobutylene and a minor proportion of a poly olefin having 4 to 10 carbon atoms per molecule to a temperature within the range between −40° C. and −103° C., adding to the cold mixture stannic chloride in an amount within the range between 0.1% and 0.2% and thereafter polymerizing the mixture containing stannic chloride within said temperature range with a Friedel-Crafts polymerization catalyst.

3. In a polymerization process the steps in combination of cooling a major proportion of isobutylene and a minor proportion of a poly olefin having 4 to 10 carbon atoms per molecule to a temperature within the range between −40° C. and −103° C., adding to the cold mixture an amount of stannic chloride within the range between 0.1% and 0.2% and thereafter polymerizing the mixture containing stannic chloride within said temperature range with a Friedel-Crafts polymerization catalyst in solution in a halogen substituted aliphatic compound having less than 5 carbon atoms per molecule and a freezing point below 0° C.

4. In a polymerization process the stpes in combination of cooling a major proportion of isobutylene and a minor proportion of isoprene to a temperature within the range between −40° C. and −103° C., adding to the cold mixture an amount of stannic chloride within the range between 0.1% and 0.2% and thereafter polymerizing the mixture containing stannic chloride within said temperature range with a Friedel-Crafts polymerization catalyst.

5. In a polymerization process the steps in combination of cooling a major proportion of isobutylene and a minor proportion of isoprene to a temperature within the range between −40° C. and −103° C., adding to the cold mixture an amount of stannic chloride within the range between 0.1% and 0.2% and thereafter polymerizing the mixture containing stannic chloride within said temperature range with a Friedel-Crafts polymerization catalyst in solution in a halogen substituted aliphatic compound having less than 5 carbon atoms per molecule and a freezing point below 0° C.

6. In a polymerization process the steps in combination of mixing together a major proportion of isobutylene and a minor proportion of a poly olefin having from 4 to 10 inclusive carbon atoms per molecule at a temperature within the range between −40° C. and −103° C., adding to the mixture from 0.1% to 0.2% of a metal halide compound selected from the group consisting of aluminum hydroxy chloride, stannic chloride, silicon tetra chloride, titanium hydroxy chloride and zirconium hydroxy chloride and thereafter polymerizing the mixture within said temperature range by the application thereto of aluminum chloride in solution in a halogen substituted aliphatic compound having a carbon number of less than 5 and a freezing point below 0° C.

7. In a polymerization process the steps in combination of mixing together a major proportion of isobutylene and a minor proportion of a poly olefin having from 4 to 10 inclusive carbon atoms per molecule at a temperature within the range between −40° C. and −103° C., adding to the mixture from 0.1% to 0.2% of a metal halide compound selected from the group consisting of aluminum hydroxy chloride, stannic chloride, silicon tetrachloride, titanium hydroxy chloride and zirconium hydroxy chloride and thereafter polymerizing the mixture within said temperature range by the application thereto of aluminum chloride in solution in methyl chloride.

8. In a polymerization process the steps in combination of cooling a major proportion of isobutylene and a minor proportion of a poly olefin having 4 to 10 carbon atoms per molecule to a temperature within the range between −40° C. and −103° C., adding to the cold mixture from 0.1% to 0.2% of aluminum hydroxy chloride and thereafter polymerizing the mixture containing aluminum hydroxy chloride with a Friedel-Crafts polymerization catalyst within said temperature range.

9. In a polymerization process the steps in combination of cooling a major prooprtion of isobutylene and a minor proportion of a poly olefin having 4 to 10 carbon atoms per molecule to a temperature within the range between −40° C. and −103° C., adding to the cold mixture an amount of aluminum hydroxy chloride within the range between 0.1% and 0.2% and thereafter polymerizing the mixture containing aluminum hydroxy chloride within said temperature range with a Friedel-Crafts polymerization catalyst in solution in a halogen substituted aliphatic compound having less than 5 carbon atoms per molecule and a freezing point below 0° C.

10. In a polymerization process the steps in combination of cooling a major proportion of isobutylene and a minor proportion of isoprene to a temperature within the range between −40° C. and −103° C., adding to the cold mixture an amount of aluminum hydroxy chloride within the range between 0.1% and 0.2% and thereafter polymerizing the mixture containing aluminum hydroxy chloride within said temperature range with a Friedel-Crafts polymerization catalyst.

11. In a polymerization process the steps in combination of cooling a major proportion of isobutylene and a minor proportion of isoprene to a temperature within the range between −40° C. and −103° C., adding to the cold mixture an amount of aluminum hydroxy chloride within the range between 0.1% and 0.2% and thereafter polymerizing the mixture containing aluminum hydroxy chloride within said temperature range with a Friedel-Crafts polymerization catalyst in solution in a halogen substituted aliphatic compound having less than 5 carbon atoms per molecule and a freezing point below 0° C.

12. In a polymerization process the steps in combination of cooling a major proportion of isobutylene and a minor proportion of dimethyl butadiene to a temperature within the range between −40° C. and −103° C., adding to the cold mixture an amount of aluminum hydroxy chloride within the range between 0.1% and 0.2% and thereafter polymerizing the mixture containing aluminum hydroxy chloride within said temperature range with a Friedel-Crafts polymerization catalyst.

13. In a polymerization process the steps in combination of cooling a major proportion of isobutylene and a minor proportion of dimethyl butadiene to a temperature within the range between −40° C. and −103° C., adding to the cold mixture an amount of aluminum hydroxy chloride within the range between 0.1% and 0.2% and thereafter polymerizing the mixture containing aluminum hydroxy chloride within said temperature range with a Friedel-Crafts polymerization catalyst in solution in a halogen substituted aliphatic compound having less than 5 carbon atoms per molecule and a freezing point below 0° C.

JOHN D. CALFEE.
ROBERT M. THOMAS.

REFERENCES CITED

The following references are of record in the file of this patent:

UNITED STATES PATENTS

| Number | Name | Date |
| --- | --- | --- |
| 2,040,658 | Kuentzel | May 12, 1936 |
| 2,142,980 | Huijser | Jan. 3, 1939 |
| 2,273,158 | Thomas | Feb. 17, 1942 |
| 2,276,893 | Thomas | Mar. 17, 1942 |

FOREIGN PATENTS

| Number | Country | Date |
| --- | --- | --- |
| 106,371 | Australia | Jan. 26, 1939 |